United States Patent [19]

Ribouleau

[11] Patent Number: 4,949,869

[45] Date of Patent: Aug. 21, 1990

[54] DISTRIBUTOR FOR A MONOSEED SOWING MACHINE

[75] Inventor: Michel Ribouleau, Paris, France

[73] Assignee: Ateliers Ribouleau, Largeasse, France

[21] Appl. No.: 342,028

[22] Filed: Apr. 24, 1989

[30] Foreign Application Priority Data

Apr. 22, 1988 [FR] France ................... 88 05398

[51] Int. Cl.⁵ .............................................. A01C 7/04
[52] U.S. Cl. ........................................ 221/211; 111/77
[58] Field of Search ................... 221/211; 111/77, 78

[56] References Cited

U.S. PATENT DOCUMENTS

| | | |
|---|---|---|
| 1,331,235 | 2/1920 | Bristow . |
| 3,990,606 | 11/1976 | Gugenhan ............... 221/211 |
| 3,999,690 | 12/1976 | Deckler ............... 221/211 X |

FOREIGN PATENT DOCUMENTS 140701 5/1985 European Pat. Off. .
2217513 11/1972 Fed. Rep. of Germany .
410390 8/1965 France .
2135702 11/1972 France .

*Primary Examiner*—F. J. Bartuska
*Attorney, Agent, or Firm*—Sherman and Shalloway

[57] ABSTRACT

The distributor comprises a generally cylindrical case which is formed by a housing (1) and a cover (4) between which is rotatively mounted a distributor disk (18) provided with circumferentially spaced-apart orifices (48, 50). Inside the housing, a partition (24) defines a depression passageway (26) in communication with an suction duct (2). The passageway (26) includes a wide upper part (27) in the shape of a crescent which is extended at both ends by a narrow branch (28, 30). Formed in the upper part of the descending branch (30), relative to the direction of rotation of the disk (18), is a cavity (32, 33) for receiving a removable element (34) for isolating this branch from the source of depression. The inner wall of the passageway is provided with an air intake (39) whose opening is adjustable.

11 Claims, 4 Drawing Sheets

DISTRIBUTOR FOR A MONOSEED SOWING MACHINE

Monoseed sowing machines are increasingly appreciated by farmers owing to the regularity and precision of the sowing.

These sowing machines are usually provided with a distributor comprising a generally cylindrical case in which is rotatably mounted, on a horizontal axis a distributor disk which is provided with circumferentially spaced-apart orifices and separates a seed container from a suction device so that its orifices are subjected to a depression which retains the seeds taken from the container during at least a part of their angular displacement, means for eliminating double seeds and, in the lower part of the case, a seed discharge opening. Each of these seeds is in this way strictly separated from the others and disposed alone in the furrow to be provided with seeds.

Some distributors, such as that described in the documents FR-A-2 135,702 and FR-A-2 2,174,341 comprise a disk provided with fins which facilitate the feeding of the orifices with seeds, and the conduction and the precise release of the seeds, which permits a very simple automatic selection of the seeds while requiring only a low depression. However, the disk can only have a limited number of fins, i.e., cavities each containing a seed, and only an increase in the speed of rotation of the disk permits increasing the density of the sowing, so sowings of high density are impossible.

Other distributors (FR-A-1 585,445) comprise a disk devoid of fins which may consequently be provided with a large number of orifices and which is consequently well adapted to a high sowing density. Unfortunately, these distributors require a considerable depression otherwise the seeds are not carried along so that they are poorly adapted to heavy seeds and large seeds.

The farmer who usually must effect a plurality of types of sowing is therefore confronted with a difficult choice or is obliged to have a plurality of sowing machines.

An object of the present invention is to overcome this drawback by providing a distributor for a monoseed sowing machine which is easily adaptable to all types of sowing.

The invention indeed provides a distributor of the aforementioned type in which the suction device comprises inside the case a depression passageway having substantially the shape of a crescent whose ends are extended toward each other by two narrow and curved peripheral branches and which includes at the beginning of one of these branches a cavity for housing a closure element capable of isolating this branch from the source of depression.

According to another feature of the invention, the cavity for the closure element is provided in the upper part of the descending branch of the depression passageway, relative to the direction of rotation of the distributor disk.

Preferably, an outer air intake is provided in the bottom of the case in the vicinity of a suction duct and is associated with a pivotal lever for adjusting its opening. The shaft of this lever may also control a selector which is in this way adapted to the nature of the seeds.

As the removable closure element combines its effects with that of the lever adjusting the outer air intake and optionally that of the selector, it permits varying the depression and thus using the distributor with a disk having fins or with a simple disk, depending on the nature of the sowing to be effected.

The following description of embodiments given by way of non-limitative examples and shown in the accompanying drawings, will bring out the advantages and features of the invention. In the drawings.

Figure 1:
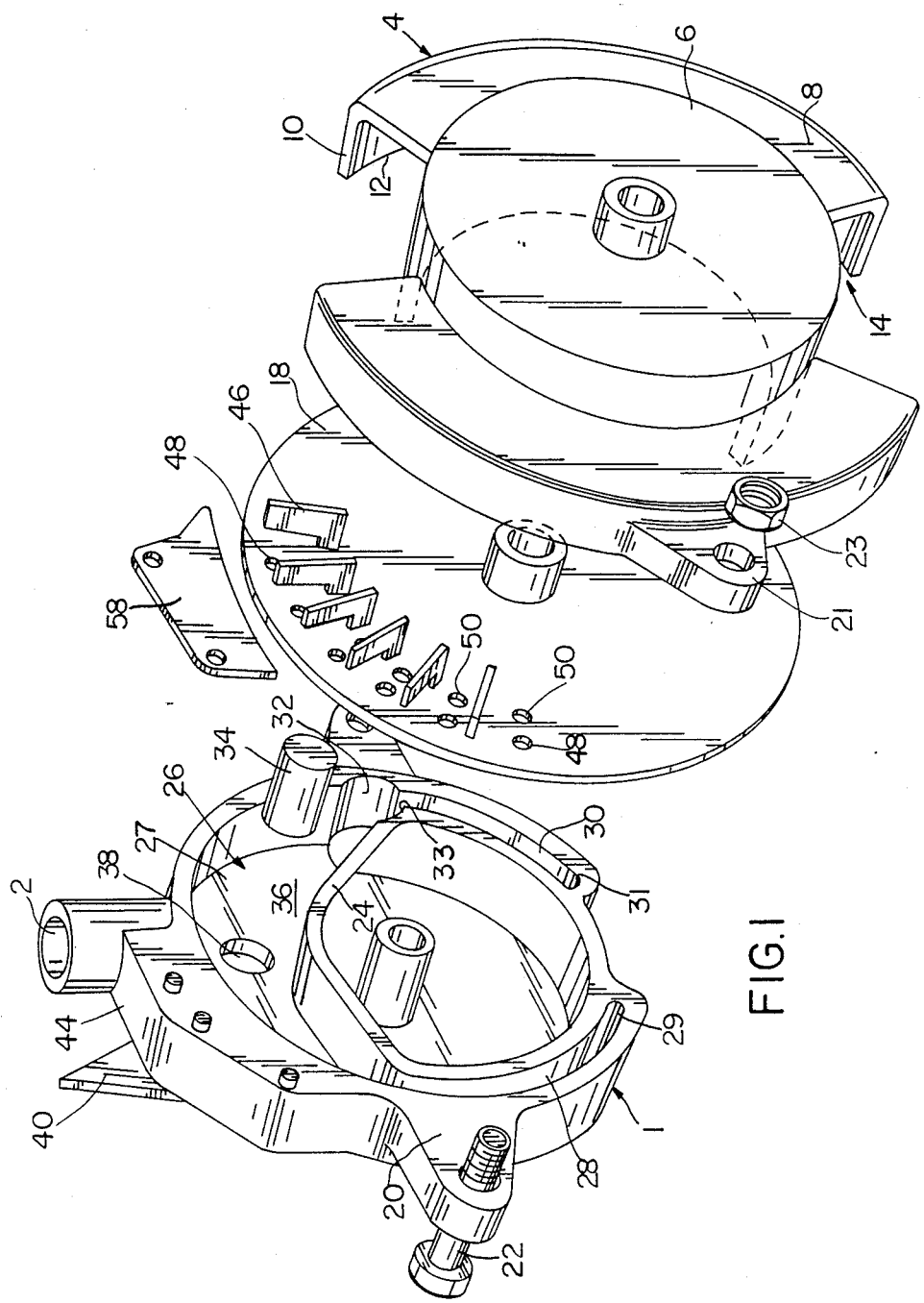
FIG. 1 is an exploded perspective view of a distributor for a monoseed sowing machine according to the invention, provided with a finned disk.
Figure 3:
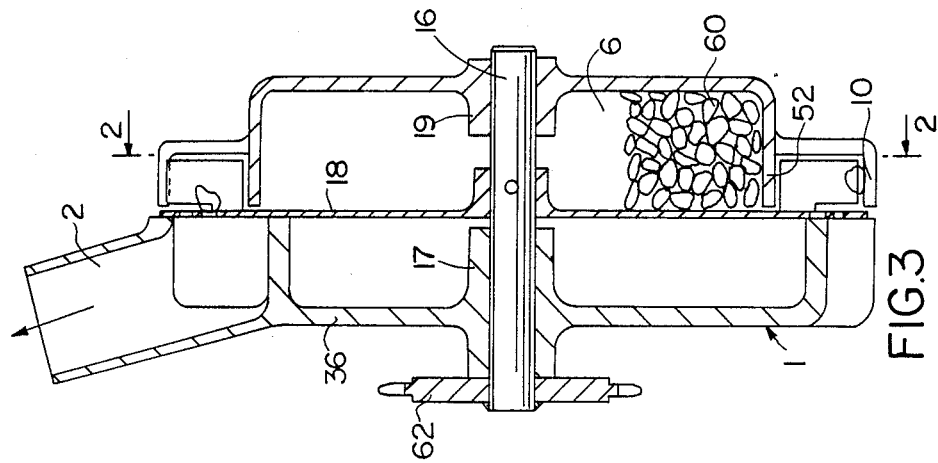
FIG. 3 is a sectional view taken on line 3—3 of FIG. 2.

A distributor for a monoseed sowing machine comprises, as shown more particularly in FIG. 1, a generally cylindrical case which is constituted by a housing 1 provided in its upper part with a duct 2 communicating with a suction element, or with another suitable source of depression, and by a cover 4 which constitutes a seed container 6 surrounded by a flange 8 provided on its periphery with a flange 10 extending toward the housing 1. The flange 8 is interrupted in its upper part at 12 to provide the communication of its inner volume with the outer atmosphere and in its lower part at 14 to form a seed discharge opening. The housing 1 and the cover 4 are mounted on the same shaft 16 by cylindrical bearing surfaces, respectively 17 and 19, which enable the shaft to rotate with respect thereto (FIG. 3).

The shaft 16 is connected to a distributor disk 18 which is in sealed contact with the wall of the housing 1 and against which the cover 4 is maintained by any suitable means. For example, in the illustrated embodiment, the housing 1 and the cover 4 each include two lateral lugs respectively 20 and 21 through which two screws 22 extend and which are clamped against each other by nuts 23.

Figure 2:
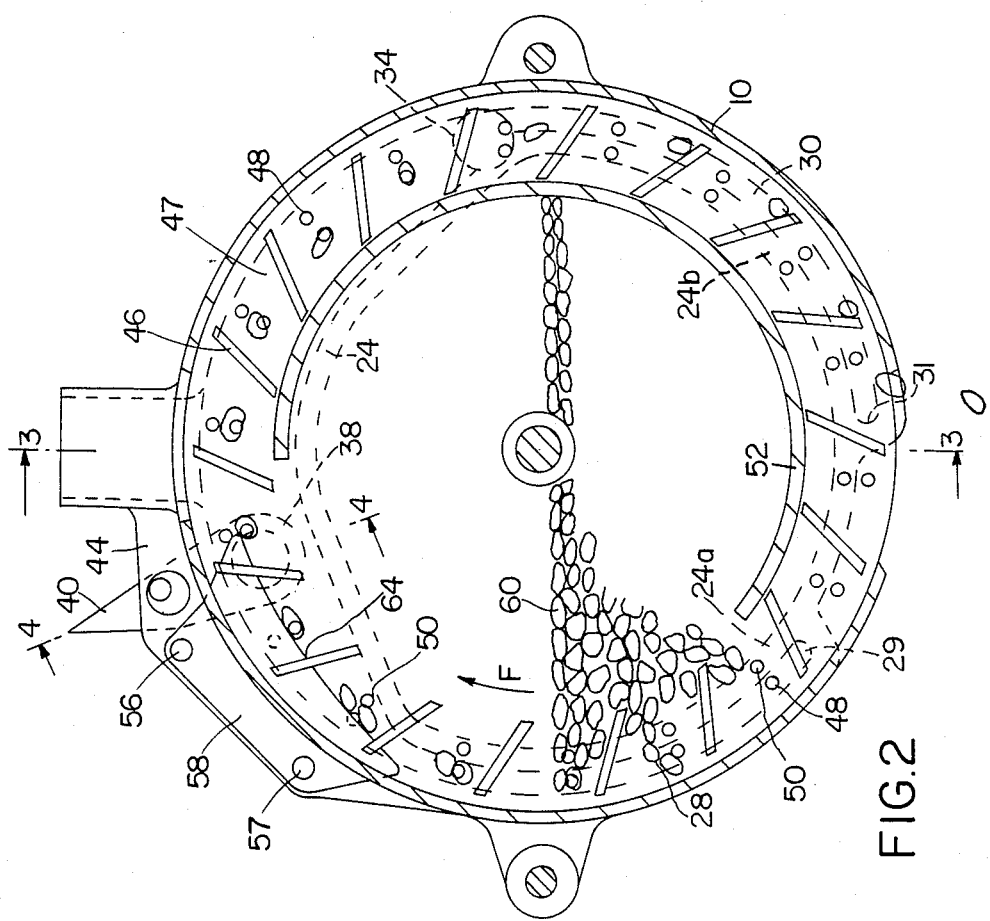
FIG. 2 is a sectional view taken on line 2—2 of FIG. 3, of the distributor of FIG. 1 when assembled.

Inside the housing 1, a partition 24 defines with the wall of this housing a depression passageway 26 which communicates with the suction duct 2. As the partition 24 has in its upper part substantially the shape of an inverted V, the depression passageway 26 comprises in the vicinity of the suction duct 2 a wide upper part 27 substantially in the shape of a crescent. Each of the ends of this crescent is extended by a narrow peripheral branch 28 and 30 respectively, these two branches extending toward each other but not joining each other. Indeed, the ends of the branches 28 and 30 are closed in the lower part of the housing 1 in the region of the seed discharge opening of the cover 4. Their ends 29, 31 are, in the illustrated embodiment, slightly off-set relative to this opening 14 so that the end 29 of the branch 28 is higher than the end 31 of the branch 30. In fact, the end 31 of the descending branch relative to the direction of rotation of the distributor disk 18, indicated by the arrow F in FIG. 2, is normally the lowest point of the distributor.

In the upper part of the branch 30, i.e. the descending branch, the wall of the housing 1 and the confronting surface of the partition 24 each comprise a curved recess, respectively 32 and 33 which together define a cavity for housing a closure element which is constituted in the illustrated embodiment by a cylindrical plug 34 but which may be formed by a flap, a slide or any other suitable element. This plug 34 has an axial length which is equal to the depth of the housing 1 so that, when it is in position in the cavity 32, 33, it completely closes the entrance of the branch 30 of the depression passageway and isolates this entrance from the suction duct 2. The plug 34 is however removable and may be easily withdrawn when the branch 30 must be subjected to a depression.

Figure 4:
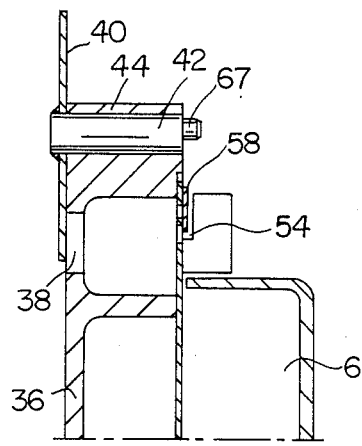
FIG. 4 is a sectional view taken on line 4—4 of FIG. 2.

The bottom 36 of the housing 1 is also provided, in the vicinity of the suciton duct 2, with an air intake 38 which is associated with a pivotal lever 40 behind the bottom 36 on a shaft 42 which extends through an outer boss 44 of the wall of the housing 1 (FIG. 4).

In the embodiment represented in FIGS. 1 to 4, the distributor disk 18 is provided with a series of fins 46 all of which extend toward the cover 4 and are evenly spaced apart on its circumference and include two circumferential rows of orifices 48, 50, one orifice of each of the rows being contained in the cavity 47 defined by two neighbouring fins 46. The diameter of the orifices 48, 50 and their radial position are such that the orifices 48 of the radially outer row are located in confronting relation to the narrow branch 28 or 30 of the depression passageway, while the orifices 50 of the inner row are placed in confronting relation to the cylindrical portion 24a, 24b of the partition 24 which defines these narrow branches 28 and 30. In the upper part of the case, the two rows of orifices 48, 50 open onto the wide part 27 of the depression passageway, as shown more particularly in FIG. 2.

On the side of the disk opposed to the depression passageway, the cavities 47 defined by the adjacent fins 46 are radially outwardly closed by the flange 10 of the flange 8 and inwardly by a cylindrical extension 52 of the wall of the seed container which extends in confronting relation to the descending part of the depression passageway in a litle more than one half of a circumference, i.e. up to a point located beyond the seed discharge opening 14.

On the other side of the distributor, i.e. in the vicinity of the rising part of the depression passageway, the cavities are in communication with the container 6. Moreover, the boss 44 carries, by means of two shafts 56 and 57, a deflector element 58 along which slides the surface of the distributor disk 18 opposed to the depression passageway. The element 58 is preferably in the form of a plate whose lower edge is rectilinear and whose profile is such that it partly overlaps, and then completely overlaps, the orifices 48 of the outer row as the width of the depression passageway 26 increases.

The distributor constructed in this way ensures with precision, by means of a low depression, sowings whose density is not very high. Indeed, when the seeds 60 have been placed in the central container 6 and the shaft 16 is driven in rotation, for example by a chain sprocket wheel 62, the seeds enter the cavities 47 located in the lower part of the housing, beyond the wall 52, and are carried along by the depression prevailing in the passageway 26 and more particularly in the ascending branch 28. Consequently, seeds are applied, generally in groups of two or three, against each of the orifices 48 corresponding to this ascending branch and are carried along in the direction toward the wide part 27 of the passageway 26. Upon entry in this widened part, each group of seeds encounters the deflector 58 which urges it in the direction toward the orifices 50 of the inner row so that only one of the seeds remains and the other seeds fall back into the central container 6. A seed is in this way applied by the depression against each of the orifices 50 and carried along by the distributor disk 18 to the region of the plug 34. At this point, the action of the depression is interrupted and a seed drops by the effect of gravity into the cavity 47 which contains it where it is retained by the fin 46 and by the flange 10 of the cover until it reaches the discharge opening 14 which enables it to fall into the furrow to be provided with seeds.

Throughout this operation, the lever 40 was maintained in the position illustrated in FIG. 2 where it completely closes the air intake 38 and ensures inside the depression passageway 26 a maximum depression and permits the distribution of relatively heavy seeds, such as seeds of corn or the like, or was shifted in such manner as to clear a more or less large part of this air intake and consequently reduce the magnitude of the depresson inside the passageway 26 for facilitating the distribution of light seeds, such as beetroot seeds.

Figure 5:
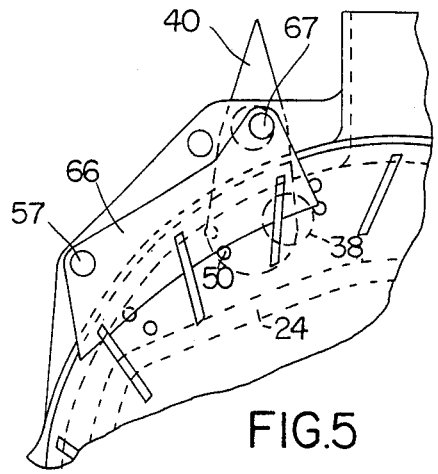
FIG. 5 is a partial view similar to FIG. 2 showing a variant of the means for eliminating double seeds.

As light seeds are often also small seeds, it may be advantageous to shift the deflector so as to more rapidly bring the rectilinear edge 64 of the deflector closer to the orifices 50 when the air intake 38 is opened. There is therefore preferably employed in this case, as a deflector, a plate 66 which is fixed, on one hand, on the fixed shaft 57, and, on the other hand, on a movable shaft 67 which is eccentric relative to the axis 42 of pivoting of the lever 40, as shown in FIGS. 4 and 5. In this way, a pivoting of the end of the lever 40 toward the left as viewed in FIG. 5, simultaneously results in an increase in the opening of the air intake 38 and a lowering of the upper end of the plate 66 so that the latter moves toward the orifices 50 which it may even partly close. It will be understood that a pivoting of the lever 40 in the opposite direction for closing the air intake on the contrary raises the upper end of the plate 60 and enables the largest seeds to be retained in an effective manner by a higher depression which is exerted through the orifices 50.

The distributor may therefore be adapted, by a simple adjustment of the position of the lever 40, to different types of seeds and ensure their planting one by one in an extremely reliable and regular manner.

Figure 6:
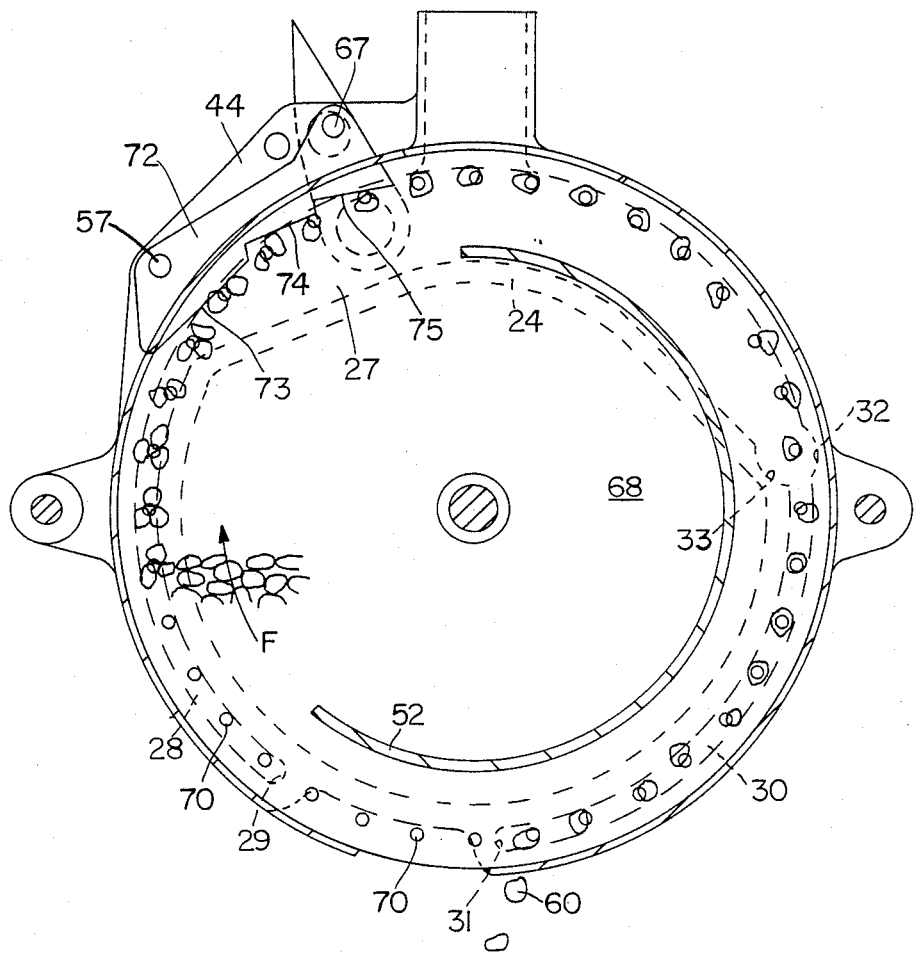
FIG. 6 is a view similar to FIG. 2 of the distributor provided with a simple disk.

This distributor may also comprise, instead of the distributor disk 18, a distributor disk 68 devoid of fins (FIG. 6) and having only one circumferential row of orifices 70. In this case, the orifices 70 are so arranged as to correspond to the depression passageway 26 and more particularly to the inner volume of the narrow branches 28 and 30. Furthermore, the plug 34 is withdrawn so that the whole of the passageway 26 is subjected to the depression and only the orifices 70 located in the space left free between the ends 29 and 31 of the narrow branches 28 and 30 are not subjected to this depression.

At the entrance of the divergent part 27 of the depression passageway 26 the boss 44 carries, by way of a deflector, a plate 72 whose lower edge is stepped and consequently forms a succession of ramps 73, 74, 75 inclined relative to the circumference formed by the orifices 70. The plate 72 is preferably mounted on the fixed shaft 57 and on the movable shaft 67 so that it is movalbe relative to the row of orifices 70 as a function of the position of the lever 40, i.e. of the opening of the air intake 38. Thus, as in the foregoing embodiment, the position of the plate 72 may vary at the same time as the magnitude of the depression prevailing in the passageway 26.

However, this depression must always be large and it must exist throughout the extent of the passageway 26. Indeed, when the disk 68 is rotated, the seeds 60 are taken from the container 6 by the suction effect exerted through the orifices 70 facing the narrow branch 28. They usually gather together in groups of two or three against each of these orifices and are carried along by the latter in the direction of the plate 72, or more exactly of the ramps 73, 74, 75. In abutting in succession against these ramps, the group of seeds is displaced and only one of the seeds remains applied against the orifice 70, the others falling back into the central container. The seed 60 which remains against the orifice is shifted along the depression passageway 26 to the end 31 of the narrow branch 31, i.e. substantially up to the moment it is in confronting relation to the discharge opening 14. It then drops onto the ground.

As in the foregoing embodiment, the magnitude of the depression and the position of the deflector element, or selection plate, may be adjusted in an extremely simple manner in accordance with the nature of the seeds. Furthermore, the distributor may be easily adapted to the different types of sowing since the replacement of the disk 18 by the disk 68, or inversely, merely requires the opening of the cover 4 to permit sliding the first disk off the shaft 16, withdraw or place back the plug 34, then mounting the new disk on the shaft 16 before placing the cover 4 back in position. Such operations may be easily carried out by a farmer so that he merely needs to possess one sowing machine and a plurality of distributor disks to be able to carry out in an effective manner any kind of sowing while being able to employ the most appropriate depression and sowing rate.

It will be understood that the distributor may also include a disk provided with fins and a single row of orifices for a sowing of heavy seeds at low density. This disk is preferably employed with the closure element 34 in position so as to limit the depression needs.

The distributor disk could also comprise more than two rows of orifices.

I claim:

1. A distributor for a monoseed sowing machine comprising a generally cylindrical case, a horizontal shaft supported on said case, a distributor disk rotatively mounted on said shaft and provided with circumferentially spaced-apart orifices, said disk separating in said case a seed container from a suction device so that the orifices are subjected to a depression which retains the seeds taken from the container during at least a part of their angular travel about said shaft, means for eliminating double seeds and, in a lower part of the case, a seed discharge opening, said suction device comprising, inside the case, a depression passageway which has substantially the shape of a crescent and ends which are extended toward each other along the periphery of the case by two narrow branches, said passageway comprising at a beginning of one of the branches a cavity and a closure element inserted in said cavity and capable of isolating said one branch from the source of depression.

2. A distributor according to claim 1, wherein the cavity for housing the closure element is formed by a widening of the depression passageway in an upper part of the descending branch relative to the direction of the rotation of the distributor disk, and the closure element is removable.

3. A distributor according to claim 1, wherein an inner wall of the depression passageway is provided with an air intake having an opening and a pivotal lever for adjusting the size of said opening.

4. A distributor according to claim 1, wherein the widest part of the depression passageway is located in an upper part of the case and a suction duct opens onto said passageway in the vicinity of said widest part of the passageway, the two narrow branches extending toward a lower part of the case and terminating on each side of the seed discharge opening.

5. A distributor according to claim 1, comprising a deflector element mounted on the case in the region of an entrance of a wide part of the depression passageway against a side of the distributor disk opposed to the depression passageway.

6. A distributor according to claim 5, wherein the deflector element is fixed.

7. The distributor according to claim 5, which further comprises an air intake having an opening on an inner wall of the depression passageway and a pivotal lever for adjusting the size of said opening, wherein the deflector element is pivotally mounted and has one end carried by a movable shaft movable by the pivoting of the lever controlling the air intake.

8. A distributor according to claim 1, comprising a distributor disk provided with a single row of circumferentially spaced-apart orifices which put the depression passageway in communication with the seed container throughout the length of the depression passageway.

9. A distributor according to claim 1, comprising a disk provided with at least one row of circumferentially spaced-apart orifices and fins which define a succession of cavities each containing an orifice of each row of orifices, the orifices of a radially outer row being in confronting relation to the narrow branches of the depression passageway and the descending branch being isolated from the source of depression by the closure element.

10. A distributor according to claim 8, wherein the deflector element has a stepped lower edge forming a plurality of successive ramps for eliminating double seeds.

11. A distributor according to claim 9, wherein the deflector element has a rectilinear lower surface.

* * * * *